(No Model.)

H. B. KEIPER.
SCREW CUTTING PLATE.

No. 530,846. Patented Dec. 11, 1894.

Witnesses:
C. Emlen Urban
S. Grant Johnston

Inventor
Henry B. Keiper
By Dan'l H. Herr.
Attorney.

THE NORRIS PETERS CO., PHOTO-LITHO., WASHINGTON, D. C.

UNITED STATES PATENT OFFICE.

HENRY B. KEIPER, OF LANCASTER, PENNSYLVANIA.

SCREW-CUTTING PLATE.

SPECIFICATION forming part of Letters Patent No. 530,846, dated December 11, 1894.

Application filed March 15, 1892. Serial No. 424,955. (No model.)

*To all whom it may concern:*

Be it known that I, HENRY B. KEIPER, of Lancaster, in the county of Lancaster and State of Pennsylvania, have invented certain new and useful Improvements in Screw-Cutting Plates; and I do hereby declare the following to be a full, clear, and exact description of the invention, such as will enable others skilled in the art to which it appertains to make and use the same.

This invention relates to improvements in screw-cutting plates of that class in which two die-sections, having either sloping or perpendicular outer faces and secured in appropriate collets, are adjustable horizontally, to a small extent, by means of a taper headed screw, or several such screws, in conjunction with tapering nuts operated on the threaded portions of said screws, in corresponding recesses formed on one side, or one on each side, of the screw-cutting chasers at the center of the opposite faces or walls where said die sections come together.

The objects of the invention are to provide better and more convenient means to limitedly adjust such die-sections, and to construct more compact, or solid, adjustable screw-cutting plates than were heretofore produced.

The purposes of the invention are attained by the mechanism and devices illustrated in the accompanying drawings, similar letters of reference designating like parts throughout the several views, in which—

Figure 1:
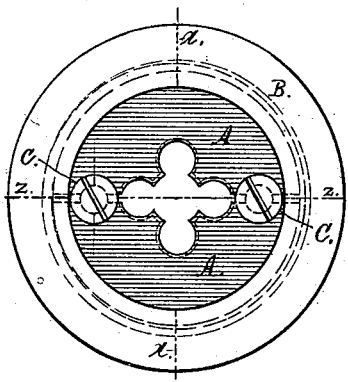
Figure 2:
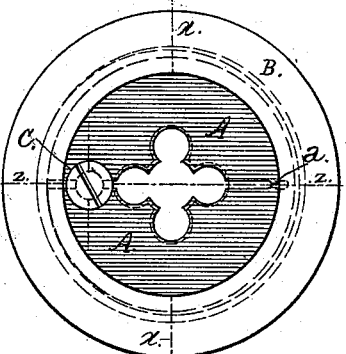
Figure 3:
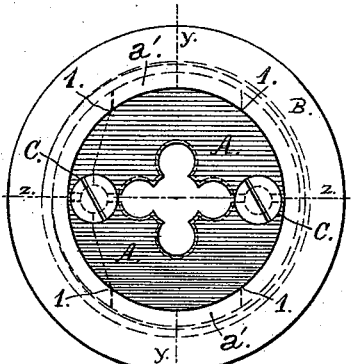
Figure 4:
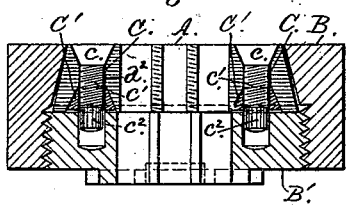
Figure 5:
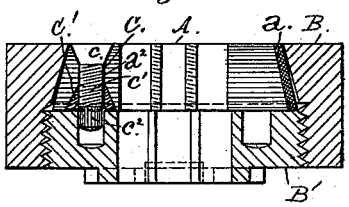
Figure 6:
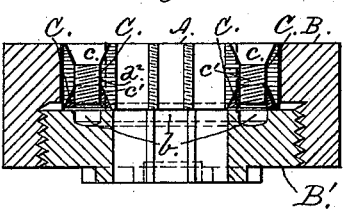
Figure 7:
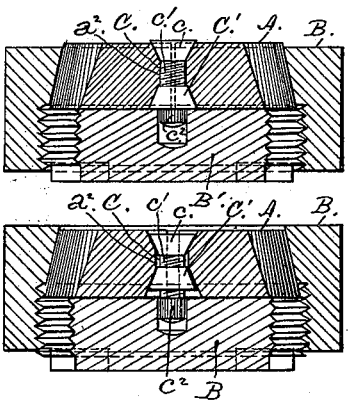
Figure 8:
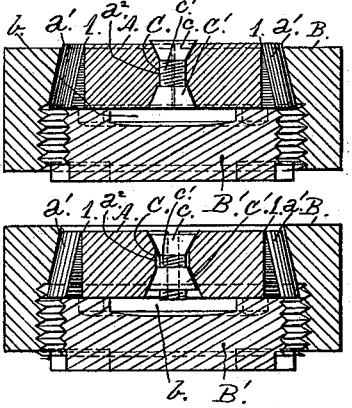

Figures 1, 2 and 3 are plans of several collets, showing three sets of die-sections embodying the elements of this invention in place; Figs. 4, 5 and 6, sectional elevations from below of the respective portions above the lines $z\ z$ in Figs. 1, 2 and 3; Fig. 7, two sectional elevations from the left, showing different degrees in adjustment of the portions to the right of the lines $x\ x$ in Figs. 1 and 2; Fig. 8, two similar elevations, showing different degrees in adjustment of the portion to the right of the line $y\ y$ in Fig. 3; Fig. 9, an enlarged elevation of the die adjusting screw detached; Fig. 10, an enlarged plan and elevation of the conical adjusting nut detached, and Fig. 11, a modified plan and elevations of the nut shown in Fig. 10.

It may be observed that the collet and dies here shown are of the same general form and construction described in my patent dated April 26, 1892, No. 473,882, except as they are modified to meet the conditions of the present invention; that the die-sections A are placed in the conical recess or chamber in the upper portion of the collet ring B and compressed therein by means of the plug-screw or guide-disk B', on whose top or upper face the die-sections rest, said guide-disk having been screwed home into the lower or cylindrical portion of said collet-ring; and, that the die-sections are separated, or kept from being closely pressed together by means of the screws C and their nuts C' which are placed between them.

In Fig. 1, the two die-sections are separated by two such screws, one being on each side of the screw cutting chasers. In Fig. 2, one screw serves the purpose, the sections being joined at one end by a narrow wall $a$, allowing them to be sprung apart by the screw, which is placed between the chasers and the open end; while in Fig. 3, two screws are used again, one screw being placed on each side of the chasers.

In Fig. 3, the die-sections are shown in a modified form, the sections being cylindrical from their ends to the points 1, having a sloping portion $a'$ in the periphery of each and opposite the chasers at the center thereof; and the inner face of the collet ring is constructed to conform thereto, to prevent said die-sections from turning when doing work; or, the die-sections may be cylindrical in form, throughout, and secured within the collet-ring by the usual plug- or set-screws tapped radially through said collet-ring, a construction so evident that its separate illustration is deemed superfluous.

The semicircular recesses $a^2$ in the perpendicular diametrical faces of the die-sections are made outwardly sloping at their lower, as well as at their upper ends, to adapt them to receive the action of the die adjusting screws C and their conical nuts C', which constitute the chief feature of the present invention and will now be particularly described and their application fully set forth.

As will be seen in the drawings (Fig. 9), the screw C consists of a taper head $c$, a threaded shaft $c'$, and a plain or smooth cylindrical lower end $c^2$. The taper head, $c$, is adapted to engage and turn in the upper slopes of the die-recesses. The threaded portion, $c'$, is adapted to have screwed thereon, the conical nut, $C'$, shown in Fig. 10, which in turn is adapted to engage and move up or down in the lower slopes of said die-recesses; while the lower end, $c^2$, of the screw is adapted to engage the orifices placed for the purpose in a diametrical line in the upper face of the screw-plug or guide-disk to keep the die-sections, between which said screws are placed, from turning while said die-sections are doing work; but, when the die-sections are made as shown in Figs. 3 and 6, the lower ends, $c^2$, of the screws are omitted, and a shallow channel, $b$, is cut round in a ring in the upper face of the plug-screw, in which the lower ends of the guide screws, C, may move freely should they project at any time below the nuts, $C'$, when the die-sections are adjusted.

In Figs. 1, 2, 4 and 5, the screws, C, and nuts, $C'$, are shown in place in their respective recesses between the die-sections, the lower ends, $c^2$, being in their respective orifices of the guide-disks, while in the two views of Fig. 7 are shown different degrees of die adjustment; and, in Figs. 3 and 6, the screws, C, are shown without the plain lower ends, $c^2$, while in the two views of Fig. 8, are shown different degrees of die adjustment in this case.

Figure 11:
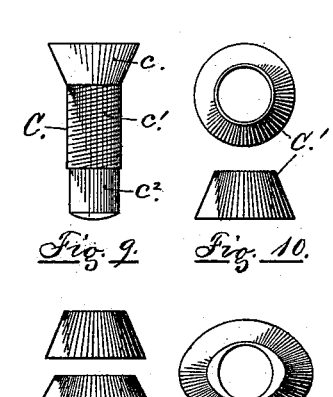

Should the nuts, $C'$, made as shown in Fig. 10, be inclined to turn in the lower slopes or ends of their respective die-recesses, said nuts may be made oblong or oval, as shown in Fig. 11, without involving any new invention, but in this case the lower ends of the die-recesses will have to be made correspondingly oval.

It will here be observed, that in the different degrees of die adjustment shown in Figs. 7 and 8, the die-sections are in close contact, at both their upper and lower edges, with the adjusting screws and nuts placed between them; and, when said die-sections are fixed securely in place in their respective collet-rings by having their respective screw-plugs or guide-disks screwed firmly home, the screw-cutting plates thus formed, will be as solid and compact as it is possible to make such plates, allowing them to be adjustable.

Having now described the invention and shown its application, what I do consider new, and desire to secure by Letters Patent, is—

In combination with a collet ring B, die sections A, a guide disk in rear of said sections, a screw between said sections and conical ends on said screws fitting corresponding recesses in the upper and under faces of the adjacent edges of the die sections, substantially as described.

In testimony whereof I have hereunto subscribed my name in the presence of two subscribing witnesses.

HENRY B. KEIPER.

Witnesses:
EDWIN BOOKMYER,
ALMON FULTON.